United States Patent [19]

Sugimori

[11] Patent Number: 4,546,239

[45] Date of Patent: Oct. 8, 1985

[54] NON-CONTINUOUS SENSING APPARATUS FOR A TEMPERATURE CONTROL

[76] Inventor: Hideo Sugimori, 12-2, Koaza Shimokubota, Ohaza Hohsono, Seikacho, Sohrakugun, Kyoto-fu, Japan

[21] Appl. No.: 499,432

[22] Filed: May 31, 1983

[30] Foreign Application Priority Data

May 31, 1982 [JP] Japan .................................. 57-93304
May 31, 1982 [JP] Japan .................................. 57-93305

[51] Int. Cl.⁴ ............................................. H05B 1/02
[52] U.S. Cl. ................................ 219/497; 219/499; 219/501; 219/492; 323/235; 307/252 UA
[58] Field of Search .............. 219/494, 497, 492, 499, 219/501, 504, 505; 323/235, 236, 319; 307/252 UA, 252 UB

[56] References Cited

U.S. PATENT DOCUMENTS

| | | | |
|---|---|---|---|
| 3,553,430 | 1/1971 | Ting | 219/505 |
| 3,590,365 | 6/1971 | Nelson | 219/505 |
| 3,633,094 | 1/1972 | Clements | 323/236 |
| 3,789,190 | 1/1974 | O'rosy et al. | 219/499 |
| 4,081,963 | 4/1978 | Stove | 219/494 |
| 4,220,840 | 9/1980 | Barker | 219/10.55 R |
| 4,333,004 | 6/1982 | Forgue et al. | 219/497 |
| 4,348,582 | 9/1982 | Budek | 219/483 |

*Primary Examiner*—M. H. Paschall
*Attorney, Agent, or Firm*—Wenderoth, Lind & Ponack

[57] ABSTRACT

A non-continuous sensing device for a temperature control including A.C. power switching element, a zero-crossing detector, a temperature sensor and a trigger pulse generator for generating a trigger pulse used to trigger the A.C. power switching element according to an output of the temperature sensor. The zero-crossing detector generates a pulse signal each time the instantaneous absolute value of the A.C. power voltage decreases to a value equal to or smaller than a predetermined value. The temperature sensor and the trigger pulse generator are kept active only for the duration of the pulse signal generated by the zero-crossing detector, thereby reducing the energy consumption and physical size of the entire device.

8 Claims, 6 Drawing Figures

NON-CONTINUOUS SENSING APPARATUS FOR A TEMPERATURE CONTROL

BACKGROUND OF THE INVENTION

The present invention relates to a non-continuous sensing apparatus for a temperature control, and more particularly to an improved electronic control device having reduced size and energy consumption.

There is shown in FIG. 1 a circuit diagram of a conventional heater drive controller by way of example. A heater 1p is power-supplied from an A.C. power source 18p through a bidirectional thyristor 2p connected in series with the heater 1p. The thyristor 2p is gated by a control signal input to its gate terminal from a comparator 4p which is devised so as to generate the control signal according to an output of a resistance bridge 5p in which a temperature sensor 6p is contained as a bridge component. Both the comparator 4p and the bridge 5p are always supplied with a D.C. power from a D.C. voltage source 13p consisting of a rectifying diode 17p, a resistor 16p, a Zener diode 15p and a smoothing capacitor 14p. Comparing a sensor output with a reference voltage which corresponds to a predetermined control value of temperature, the comparator 4p outputs a switching-on trigger signal at the time of the zero-crossings of the A.C. power source 18p. The trigger signal is fed to the thyristor gate 2p so as to energize the heater 1p while the bridge output continues to indicate that the temperature measured by the sensor 6p is lower than the predetermined control value of temperature.

In such a conventional device, the heat dissipation or the energy consumption in the control system is help being large, because the temperature sensor 6p and the comparator 4p are kept supplied with a current at all times during the operation of the device. In addition, in case the temperature sensor 6p, as is often the case, can not be chosen so as to have a large resistance value, the current to be supplied to the sensor must be increased to obtain a necessary sensitivity, and the problem of heat dissipation becomes more serious. Large dissipation of heat not only makes it difficult to assemble the whole device compactly but also causes the device to be damaged due to overheating.

OBJECTS AND SUMMARY OF THE INVENTION

An object of the present invention is to provide an improved heater control device in which the heat dissipation from the control circuit including a D.C. power supply is largely reduced so as to not only make the device, if assembled compactly, free from troubles due to over-heating but also to save energy. Another object of the present invention is to provide a heater control device which works sensitively without using an amplifier even if the resistance of the temperature sensor is small.

A heater control device based on the present invention comprises a zero-crossing detector which generates a pulse signal each time the instantaneous absolute voltage of the A.C. power source becomes lower than a certain definite small value. The pulse signal controls a D.C. switching element to supply a current to a temperature sensor only for a short duration of the pulse signal. The temperature measured by the sensor is compared by a comparator with a predetermined temperature control value, and if the temperature is lower than the predetermined value, the comparator outputs a trigger pulse to an A.C. power switching element which is connected in series with the heater to be controlled. For the A.C. power switching element, a uni- or bi-directional thyristor is used. The thyristor, is made conducting by the trigger pulse as long as the temperature measured by the sensor is lower than the predetermined value. With the temperature increased up to the predetermined value, the comparator ceases outputting the trigger pulse and the thyristor is then turned off. As briefly described above, the sensor is kept active only for a short duration of time equal to the width of the pulse signal generated by the zero-crossing detector, so that the comparator also need not always be kept active except for the same duration of time.

Accordingly, the power consumption in the control system is greatly reduced. In addition, according to the present invention, the sensitivity of the temperature sensor can easily be improved by increasing a current supplied thereto, because the current is pulse-shaped in accordance with the pulse signal of the zero-crossing detector.

Other objects and advantages of the present invention will become apparent from the following detail description when taken in conjunction with the appended claims.

DETAILED DESCRIPTION OF THE INVENTION

Figure 1:
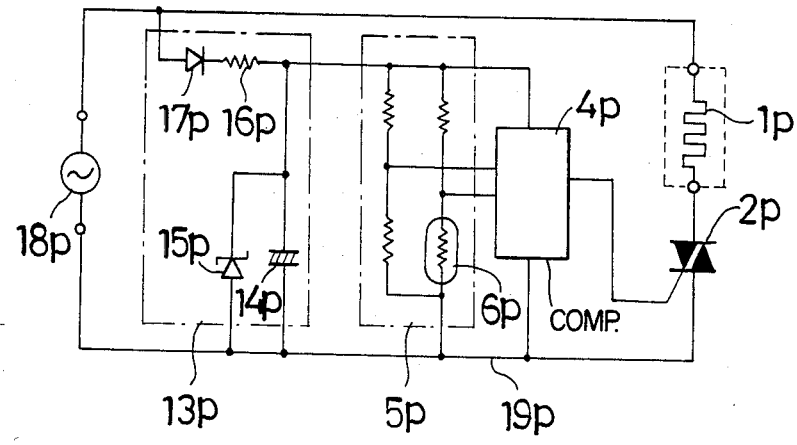
FIG. 1 shows a circuit diagram of a conventional heater control device.
Figure 2:
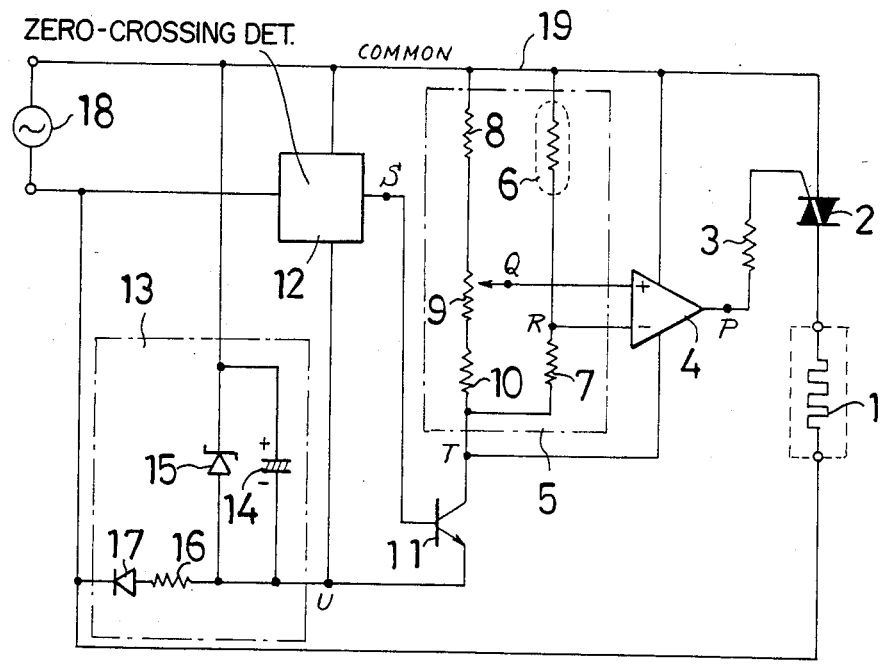
FIG. 2 shows a circuit construction of an embodiment of the present invention.

Referring to FIG. 2, a heater 1 is power-supplied from an A.C. power source 18 through a bi-directional thyristor 2 connected in series with the heater 1. The thyristor 2 is controlled by a trigger signal which is output from a comparator 4 and then input to the gate of the thyristor 2 through a resistor 3. A temperature sensor 6, which is, for example, made of a platinum resistor with a positive temperature coefficient, constitute a resistance bridge 5 together with resistors 7, 8, 9, and 10. The resistor 9 is of a variable type and gives a point Q a standard potential so selected as to correspond to a predetermined control value of temperature. A potential there appears at a point R where the sensor 6 and the resistor 7 are connected together which varies in accordance with the resistance variation of the sensor 6 subject to the temperature to be measured. The standard potential and the varying potential are respectively input to the non-inverting and the inverting input terminals of the comparator 4. The current to be supplied to the resistance bridge 5 is switched on or off by a transistor 11, whose base is fed a switching pulse from a zero-crossing signal detector 12 which generates a pulse signal each time the instantaneous absolute voltage of the A.C. power source 18 becomes lower than a certain definite small value. The D.C. power to operate the comparator 4, the resistance bridge 5 and the zero-crossing detector 12 is supplied by a D.C. voltage source 13 consisting of a rectifying diode 17, a resistor 16, a Zener diode 15 and a smoothing capacitor 14. In this embodiment, the D.C. voltage source 13 has the positive side of its output connected to a common line 19 of the whole circuit.

Figure 3:
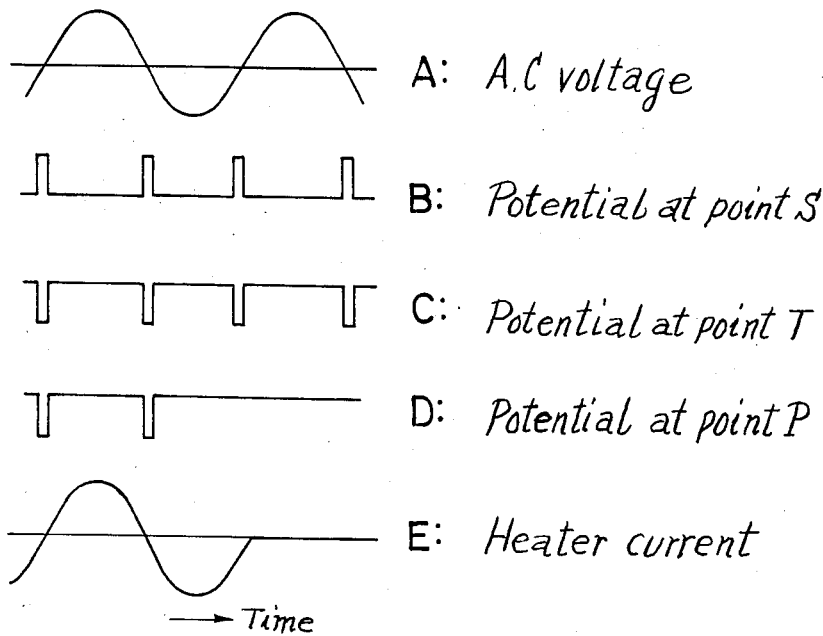
FIG. 3 shows the voltage and current wave forms observed at various points in the circuit construction shown in FIG. 2.

In such a circuit construction, each time the voltage of the A.C power source 18 is varying in the vicinity of the zero level with that zero level included, the zero-crossing detector 12 outputs a pulse signal at a point S. The relationship between the A.C voltage and pulse signal is shown by the time-charts A and B in FIG. 3, where A and B show the A.C voltage and the pulse signal, respectively. Supplied with the pulse signal at its base, the transistor 11 is made conducting so as to allow a D.C. current to flow in the bridge circuit 5 only for a duration of the pulse signal, and at the same time, the potential at a point T, from which a negative voltage is supplied to the comparator 4, turns to a value substantially equal to the potential at the output point U of the D.C power source 13. Otherwise, the potential at the point T is kept at zero volts or the potential of the common line 19 of the whole circuit, and therefore, the comparator 4 is also kept active only for the same duration of the pulse signal. The potential at the point T is shown by a time chart C in FIG. 3. Under such a performance of the circuit, if the temperature is lower than the predetermined value, the potential at the point R is higher than that at the point Q when the current is supplied to the bridge 5 due to the transistor 11 conducting, and the comparator 4 then outputs a negative voltage signal which is used to trigger the thyristor 2. On the other hand, if the temperature increases up to the predetermined value, the comparator output turns to zero. Even if the temperature increases over the predetermined value so as to invert the above potential difference between the points R and Q, the comparator output still remains constant at zero, because it is supplied only with a negative voltage source. Therefore, only while the temperature is under the predetermined control value of temperature, will the comparator 4 continue to output the trigger signal to the thyristor 2 each time the A.C. voltage crosses the zero level. The heater 1 is thus kept energized until the temperature rises up to the predetermined value. The A.C current through the heater 1 and the time-variation of the potential at the output point of the comparator 4 are shown, respectively, in the time charts E and D in FIG. 3. After the temperature has increased to the predetermined value, the potential at the point P remains zero without the generation of the trigger pulses, whereas the heater current is kept cut off except for half a cycle after the final trigger pulse. In addition, it will be understood from the circuit shown in FIG. 2 that the D.C. power source 13 does not constitute a constant-voltage source, although a Zener diode 15 is used. The Zener diode 15 is only for keeping the upper limit of the D.C. output at the Zener voltage. When the instantaneous voltage rectified by the diode 17 is lower than the Zener voltage, the capacitor 14 supplies the necessary currents. The variation of the D.C. voltage does not exert any bad influence on the temperature measurement, because the sensor 6 together with the other resistors constitute a bridge circuit. Therefore, the resistor 16 is chosen to have a high resistance and a low wattage in accordance with a very small average value of the pulse-shaped output current supplied through the transistor 11, even if the pulsed current through the bridge 5 is made relatively large so as to increase the sensitivity of the bridge 5.

Figure 4:
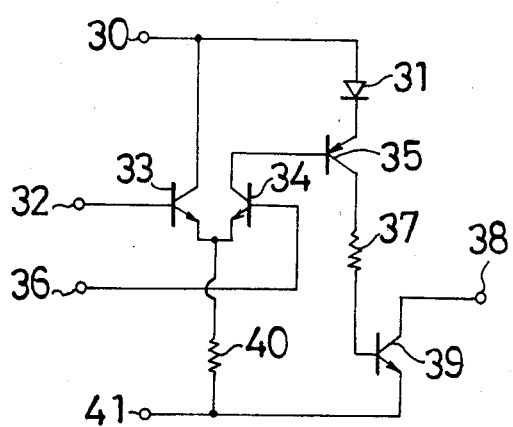
FIG. 4 shows a recommended circuit example of the comparator to be used in the present invention.

In the following, there is shown in FIG. 4 an example of the circuit construction of the comparator 4, for which a commercially available IC operational amplifier may of course be used. Referring to FIG. 4, transistors 33 and 34 constitute a differential amplifier together with a resistor 40. The collector output current of the transistor 34, being amplified by a transistor 35, is supplied through a resistor 37 to a transistor 39 whose collector forms the final output terminal 38 corresponding to the point P in FIG. 2. A terminal 36 which is connected to the base of the transistor 34 is an inverting input terminal, while a terminal 32 which is connected to the base of transistor 33 is the non-inverting terminal. The emitter of the transistor 35 is connected through a diode 31 to the collector of the transistor 33 and constitutes a terminal 30 which is to be connected to the common line 19 in FIG. 2. From the common line, the positive source voltage is supplied. On the other hand, the emitter of the transistor 39 and the other side of the resistor 40 are supplied with the negative source voltage through a terminal 41 which is to be connected to the point T in FIG. 2. In such a circuit construction, if the potential at the inverting terminal 36 is lower than that at the non-inverting terminal 32, the transistor 34 is kept non-conducting. On the contrary, if the potential at the inverting terminal 36 is higher, then the transistor 34 is made conducting. With the transistor 34 turned on so as to be conducting, the transistors 35 and 39 are also made conducting to "pull in" a current from the terminal 38, which corresponds to the point P in FIG. 2. The diode 31 inserted in the emitter line of the transistor 35 is provided so as to make it impossible for this comparator to generate an output unless the negative potential at the inverting terminal 36 is more deeply negative than a predetermined negative potential. This is to prevent trigger pulse generation when the inverting terminal potential rises abnormally, for example, due to an accident short of the temperature sensor 6 (FIG. 2), which is connected between the inverting terminal 36 and the common line 19 (FIG. 2). As long as the short-circuit between the inverting terminal 36 and the common line is "perfect", neither the transistor 34 nor 35 is made conducting, in principle, due to the emitter-base resistance of the transistor 35, even if the diode 31 is not inserted. But, if the short-circuit has a small value of resistance, the potential at the base of the transistor 34 may possibly be kept at a enough low level so as to make the transistors 34 and 35 conducting. By inserting the diode 31, both of the transistors are kept inactive, unless the potential at the base of the transistor 34 is kept lower than the common line potential at least by the potential drop in the diode 31.

Figure 5:
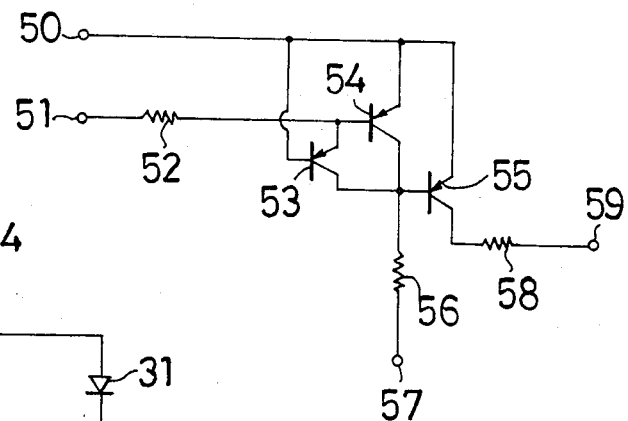
FIG. 5 shows a recommended circuit example of the zero-crossing detector to be used in the present invention.

In addition, there is shown in FIG. 5 a preferable circuit example of the zero-crossing detector 12, for which a commercially available IC unit may be used. In FIG. 5, terminals 50 and 57 are D.C. power input terminals, and a terminal 59 is a signal output terminal, which corresponds to the point S in FIG. 2. An A.C. voltage from the A.C. power source 18 in FIG. 2 is input between a terminal 51 and the terminal 50 which is connected to the common line 19 in FIG. 2. While the absolute value of the A.C. instantaneous voltage is sufficiently high, either a transistor 53 or 54 is alternately made conducting, and a transistor 55 is kept non-conducting, because the potential of its base rises substantially up to the common line potential due to the voltage developed in a resistor 56. The transistor 55 is made conducting only for a short time-width in which both of the transistors 53 and 54 are kept non-conducting due to the falling level of the A.C. absolute voltage down to a level equal to or lower than the emitter-base cut-off voltage of both transistors. The width of the pulse signal obtained by this zero-crossing detector circuit is about 100 μsec., while that of a conventional zero-crossing detector is about 300 to 400 μsec. According to this zero-crossing detector circuit, the power dissipation of the heater control device is reduced to ⅓ or less.

Figure 6:
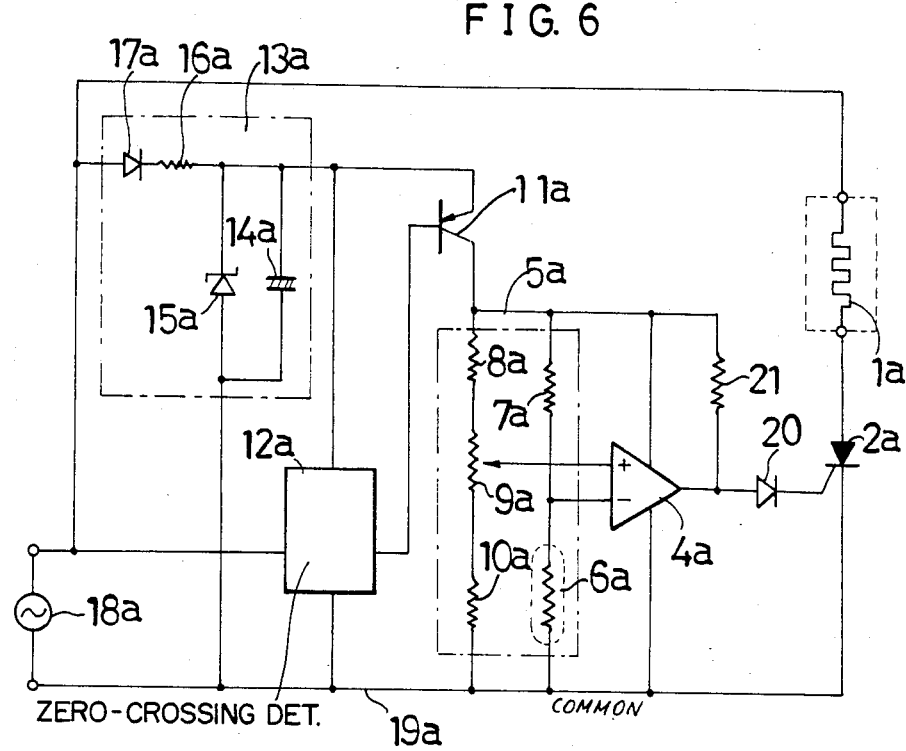
FIG. 6 shows a circuit construction of another embodiment of the present invention.

FIG. 6 shows an another embodiment of the heater control device based on the present invention. This embodiment, in which a uni-directional thyristor 2a is used as an A.C. power switching element, is suitable to control a heater of relatively low power, since the heater is supplied with only half cycles of the A.C power. In this embodiment, a zero-crossing detector 12a, a bridge circuit 5a and a comparator 4a are operated with a positive D.C voltage supplied. Therefore, a PNP transistor is used as a D.C switching transistor 11a in this circuit. The negative output of a D.C power source 13a is connected to the common line 19a of the whole circuit. In FIG. 6 all the elements which correspond to those in FIG. 2 are given the same reference numeral with a symbol "a" suffixed. While a temperature detected by a sensing bridge 5a remains lower than a predetermined value of temperature, a transistor provided at the output stage within the comparator 4a is kept non-conducting, so that a pulse signal from the transistor 11a is input, as a trigger pulse, to the gate of the thyristor 2a through a resistor 21 and a diode 20. If the temperature rises up to the predetermined value, said transistor within the comparator 4a is made conducting, and the pulse current from the transistor 11a flows into the comparator 4a without triggering the thyristor 2a.

The present invention is not limited to the embodiments described above, but it is possible to make various modifications without departing from the spirit of the invention. Modifications, changes and equivalents to the appended claims should be considered as within the scope of the invention.

What is claimed is:

1. A non-continuous sensing apparatus for a heater control in which a heater is power-supplied from an A.C. power source through an A.C. power switching element connected in series with said heater, and said A.C. power switching element is operated in accordance with a temperature signal from a temperature sensor, said apparatus comprising:
    a D.C. power source for supplying currents necessary to operate said heater control;
    a zero-crossing detector for generating a pulse signal each time the instantaneous absolute voltage value of said A.C. power source becomes smaller than a certain definite value;
    a D.C. current switching element for switching a current to be supplied to said temperature sensor and a comparator in accordance with said pulse signal generated by said zero-crossing detector;
    wherein said comparator compares an output of said temperature sensor with a standard voltage which corresponds to a predetermined control temperature value;
    wherein said D.C. current switching element is made conducting by said pulse signal generated by said zero-crossing detector only for a duration of the pulse width of said pulse signal used to cause said D.C. power source to non-continuously supply a current to said temperature sensor so as to enable said sensor to measure a temperature of an object which is being heated by said heater;
    and wherein said power switching element is triggered by a triggering pulse which said comparator generates only when the temperature measured by said temperature sensor is lower than said predetermined temperature value.

2. An apparatus as defined in claim 1 wherein said temperature sensor is a constituent of a resistance bridge.

3. An apparatus as defined in claim 1, wherein said comparator comprises a differential amplifier using two transistors as active elements, said two transistors having bases used as signal input terminals, a collector of one of said two transistors being connected directly to a power line of said D.C. power source and a collector of the other transistor being connected to said power line through a series connection of a diode and another transistor, and said differential amplifier being arranged so as not to provide an output if the voltage difference between said power line and an input signal to said base of said transistor whose collector is connected to said power line through said series connection of said diode and said another transistor is smaller than a predetermined value.

4. An apparatus as defined in claim 1, wherein said zero-crossing detector consists of first and second transistors, a base of said first transistor and an emitter of said second transistor being connected to a common line of said A.C. power source, an emitter of said first transistor and a base of said second transistor being connected to a non-common line of said A.C. power source, and collectors of both said first and said second transistors being connected together so as to form a zero-crossing detection signal output terminal.

5. An apparatus as defined in claim 2, wherein said comparator comprises a differential amplifier using two transistors as active elements, said two transistors having bases used as signal input terminals, a collector of one of said two transistors being connected directly to a power line of said D.C. power source and a collector of the other transistor being connected to said power line through a series connection of a diode and another transistor, and said differential amplifier being arranged so as not to provide an output if the voltage difference between said power line and an input signal to said base of said transistor whose collector is connected to said power line through said series connection of said diode and said another transistor is smaller than a predetermined value.

6. An apparatus as defined in claim 2, wherein said zero-crossing detector consists of first and second transistors a base of said first transistor and an emitter of said second transistor being connected to a common line of said A.C. power source, an emitter of said first transistor and a base of said second transistor being connected to a non-common line of said A.C. power source, and collectors of both said first and said second transistors being connected together so as to form a zero-crossing detection signal output terminal.

7. An apparatus as defined in claim 3, wherein said zero-crossing detector consists of first and second transistors, a base of said first transistor and an emitter of said second transistor being connected to a common line of said A.C. power source, an emitter of said first transistor and a base of said second transistor being connected to a non-common line of said A.C. power source, and collectors of both said first and said second transistors being connected together so as to form a zero-crossing detection signal output terminal.

8. An apparatus as defined in claim 5, wherein said zero-crossing detector consists of first and second transistors, a base of said first transistor and an emitter of said second transistor being connected to a common line of said A.C. power source, an emitter of said first transistor and a base of said second transistor being connected to a non-common line of said A.C. power source, and collectors of both said first and said second transistors being connected together so as to form a zero-crossing detection signal output terminal.

* * * * *